J. H. DE BUHR.
AUTOMATIC CLUTCH RELEASE.
APPLICATION FILED DEC. 8, 1913.

1,107,915.

Patented Aug. 18, 1914.
2 SHEETS—SHEET 1.

WITNESSES:
Harry A. Bennett
Fannie E. Weber

INVENTOR.
John H. De Buhr.
BY
Emil Starek
ATTORNEY.

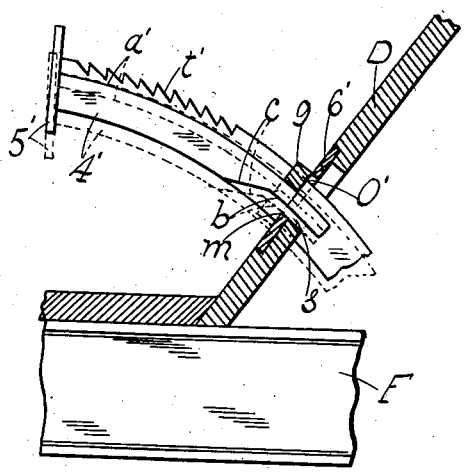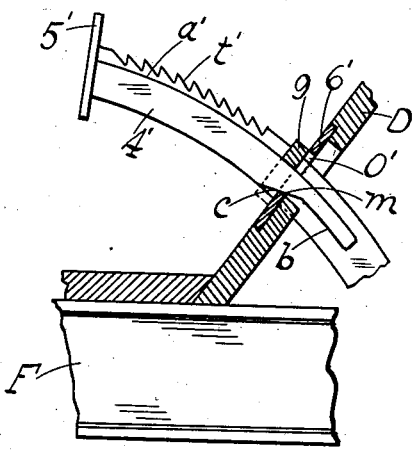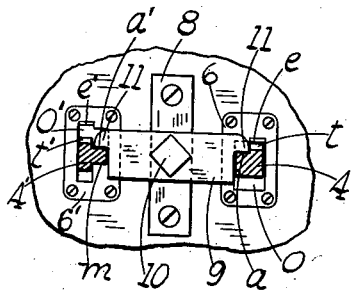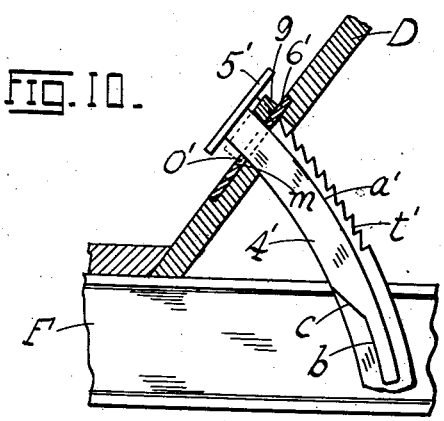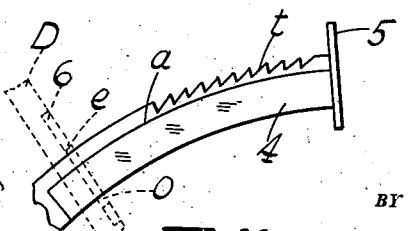

UNITED STATES PATENT OFFICE.

JOHN H. DE BUHR, OF ST. LOUIS, MISSOURI.

AUTOMATIC CLUTCH-RELEASE.

1,107,915.

Specification of Letters Patent.

Patented Aug. 18, 1914.

Application filed December 8, 1913. Serial No. 805,333.

*To all whom it may concern:*

Be it known that I, JOHN H. DE BUHR, citizen of the United States, residing at St. Louis, State of Missouri, have invented certain new and useful Improvements in Automatic Clutch-Releases, of which the following is a full, clear, and exact description, reference being had to the accompanying drawings, forming a part hereof.

My invention has relation to improvements in automatic clutch-releases; and it consists in the novel details of construction more fully set forth in the specification and pointed out in the claims.

Figure 1:
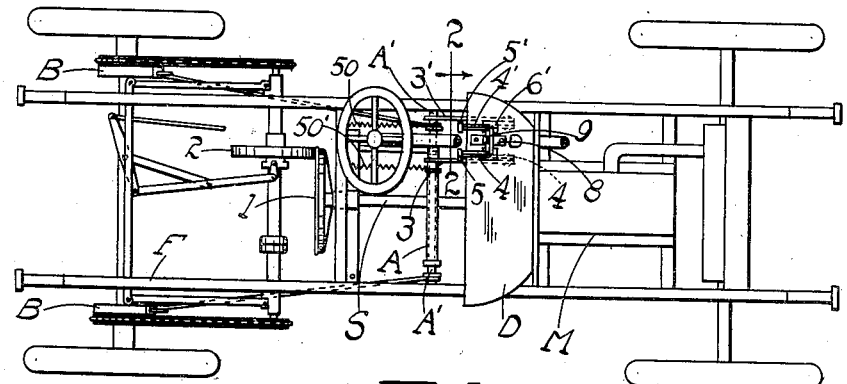
Figure 2:
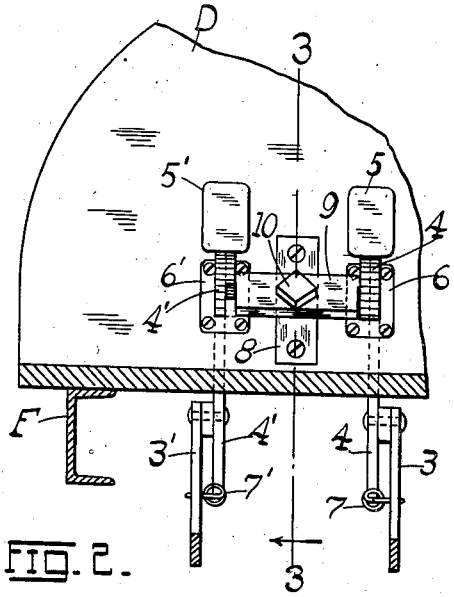
Figure 3:
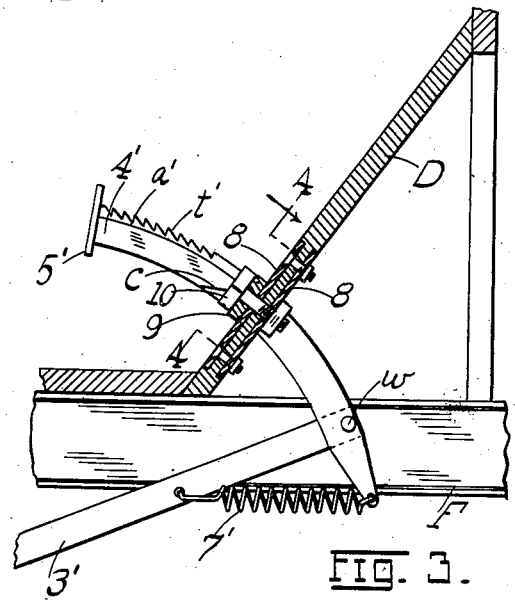
Figures 4, 5:
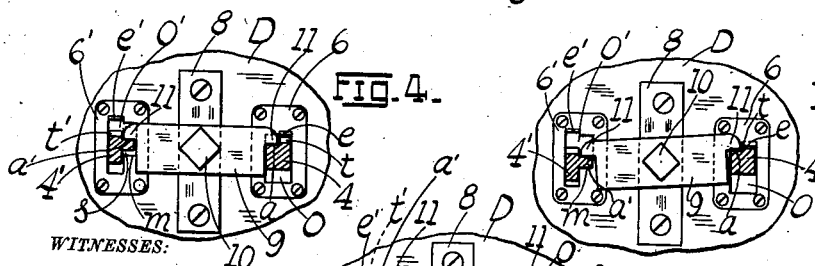
Figure 6:
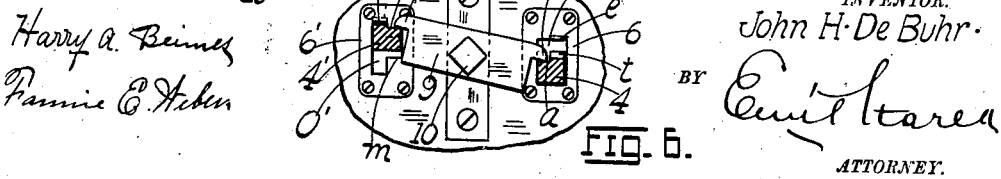

In the drawings, Figure 1 is a plan view of an automobile running gear showing my invention applied thereto; Fig. 2 is an enlarged vertical cross-section on the line 2—2 of Fig. 1; Fig. 3 is a vertical longitudinal section on the line 3—3 of Fig. 2; Fig. 4 is a cross-section on the line 4—4 of Fig. 3, some of the parts, however, being left in elevation; Fig. 5 is a section similar to Fig. 4, with the clutch-pedal thrown and set; Fig. 6 is a similar section with the brake pedal fully thrown and set; Fig. 7 is a sectional detail showing the brake-pedal and brake-ratchet; Fig. 8 is a similar view with the pedal partially thrown; Fig. 9 is a section similar to Fig. 4 with the brake-pedal thrown a distance corresponding to that shown in Fig. 8; Fig. 10 is a sectional detail similar to Fig. 7, showing the brake-pedal fully thrown and set; and Fig. 11 is a detached view of the clutch-ratchet with a part broken away.

The present invention finds special application in motor-vehicles provided with pedal-operated brakes and clutches; and has for its object to provide a construction by which the clutch which controls the running gear of the vehicle may be automatically disengaged from said running gear when the brake-pedal is actuated or thrown to apply and set the brakes.

A further object is to so control the clutch, that when traveling in congested districts, it may be instantly released when the foot is removed from the clutch-pedal.

A further object is to provide a construction which will render it impossible to throw the clutch, (that is, cause its engagement with the running gear,) when the brake is applied; and to provide further and other structural features, the advantages of which will be fully apparent from a detailed description of the invention which is as follows:—

Referring to the drawings, F represents the frame of an automobile on which is mounted the motor M to which is directly connected the shaft S carrying the clutch-disk 1. The clutch 1 as well understood in the art is adapted to engage the wheel or disk 2 identified with the running gear (of the vehicle) which is herein shown more or less conventionally because well known in the art. The limited movement imparted to the clutch 1 to cause the same to engage with and be disengaged from, the disk 2 is brought about through suitable connections between the hollow spring-controlled rocker-shaft A and motor-shaft S, the member A being operated in one direction by a lever 3 (termed the clutch-lever) which is in turn actuated by the clutch-ratchet 4 terminating in a pedal 5.

The features just described are well understood by those skilled in the art and no detailed or complete illustration of the connections between the members A and S is here attempted. In a similar manner the brake-bands B are controlled from the inner rock-shaft A' (mounted in the hollow rock-shaft A), the member A' being operated through the brake-lever 3' which is in turn actuated by the brake-ratchet 4' terminating in a pedal 5'. Because these features are likewise old, no detailed description thereof is necessary.

As apparent from the foregoing, the clutch-lever and brake-lever operate independently. Under my invention however, the brake-lever exercises a special control over the clutch-lever, with the application and setting of the brakes. The mechanism by which this control is effected is as follows:—The clutch-ratchet 4 passes through the opening O in the plate 6, and when set, the teeth t thereof engage behind the upper edge e of the opening O in said plate. The opening O continues through the foot-board D as is obviously necessary. It will be noticed that the ratchet 4 is provided with a lateral shoulder, offset, or ledge a (below the teeth t) along a portion of its length, the purpose of which will presently be seen.

We will now take up the brake-operating parts. The brake-ratchet 4' passes through the irregular shaped opening O' in the plate 6', secured to the footboard D and, like the clutch-ratchet, is provided with teeth $t'$ adapted to catch behind the edge $e'$ of the opening $O'$. The brake-ratchet $4'$ is likewise provided with a shoulder or offset $a'$ along a portion of its length but in addition to the shoulder $a'$, the brake-ratchet has an offset $b$ opposite the offset $a'$ provided with an inclined face $c$. The ratchets 4, $4'$, are provided with compression springs 7, $7'$, respectively secured to their lower extremities, and to the levers 3, $3'$.

Secured to the opposite faces of the dashboard D about midway between the ratchets 4, $4'$, are the reinforcing plates 8, 8, and pivotally mounted on a stud or bolt 10 passed through said reinforcing plates is a lever 9, freely oscillatable about said stud 10. The ends of the lever are provided with the guide-lugs 11, 11, disposed adjacent the upper edge of the lever, said lugs being adapted to project over and come in contact with, the shoulders $a$, $a'$, of the ratchets 4, $4'$, respectively. The lower edge $m$ of the opening $O'$ coöperates with the offset $b$ (and its extension $c$) of the brake-ratchet in a manner to be fully described in connection with the description of the operation of the invention, which is as follows:—

Let us start with the automobile at rest when the brakes are set and the clutch released from the disk 2. Now in order to release the brake-bands B it is necessary to disengage the teeth $t'$ of the brake-ratchet $4'$ from the edge $e'$ of the opening $O'$ formed in the plate $6'$. This disengagement is brought about by a depression of the pedal $5'$ which oscillates the member $4'$ about its pivotal stud $w$ at the end of the lever $3'$, the tension of the spring $7'$ being necessarily overcome in such depression of said member $4'$. The teeth $t'$ being thus released from the edge $e'$, will permit the ratchet $4'$ to be forced upwardly by the tension of the spring 50 which as well understood in the art controls the rock-shaft $A'$ to which the lever $3'$ directly leads, the brake-ratchet thus assuming the position shown in Fig. 3. Both the clutch and brake are now released and the ratchets 4, $4'$, and the oscillating lever 9 take the relative positions shown in Fig. 4. We are now free to utilize either the brake or the clutch, and if we desire to proceed, we throw in the clutch. As is well understood in this type of machine, we can cause the clutch to grip the member 2 with any desired tenacity, depending upon the character of road over which we are traveling. By a glance at Fig. 5, we see that when the clutch-ratchet (and lever 3) have been forced downward, by a pressure of the foot on the pedal 5, a sufficient degree to allow any of the teeth $t$ to pass across the edge $e$ of the opening O, said teeth will be forced into engagement with said edge under the contracting action of the spring 7 attached to the lower lever arm of the ratchet and to the lever 3 respectively, said spring tending to throw the long arm of the ratchet 4 upwardly. In such upward oscillation of the member 4, the lever 9 will necessarily be rocked to the position shown in Fig. 5, since one of the guide-lugs 11 of the lever 9 is in contact with the shoulder $a$ of said ratchet 4. The opposite guide-lug 11 of the member 9 bears against the shoulder $a'$ of the ratchet $4'$, so that when the end of the lever 9 bearing against the shoulder $a$ of the ratchet 4 is raised, the opposite end thereof, and hence the ratchet $4'$ must be depressed. It follows therefore, that when the clutch 1 is set, the brake-ratchet $4'$ is depressed by the lever 9 (dotted view Fig. 7) said depression being permitted by reason of the space $s$ (Fig. 7) between the face of the offset $b$ and the edge $m$ of the opening $O'$, and no effect will be had upon the clutch. The object of this slight depression is to enable the operator to actuate the brake-ratchet $4'$ sufficiently to take up the slack on the brake mechanism so that when he desires to apply the brakes, they will act instantly. For purposes of taking up the slack the ratchet $4'$ is moved sufficiently to bring the inclined face $c$ across the edge $m$; but as soon as said inclined face $c$ comes in contact with the edge $m$ of the opening $O'$ the ratchet $4'$ will be forced upwardly, the lever 9 rocked back to a horizontal position, as shown in Figs. 8 and 9, at which point the teeth of the clutch-ratchet 4 will be released from engagement with the edge $e$ and the clutch-ratchet will resume its middle position in the opening $O'$. The brake-ratchet $4'$ can then continue to be actuated from the pedal $5'$ if desired. From this description it will be seen that it is impossible to apply the brake without automatically releasing the clutch.

Referring to Figs. 8 and 9, it will be observed that the brake-ratchet $4'$ has been moved until the face $c$ thereof has come in contact with the edge $m$ of the opening $O'$, thereby taking up the slack on the brake mechanism and causing the lever 9 to depress the long arm of the clutch ratchet 4 and thereby hold the teeth $t$ thereof out of possible engagement with the edge $e$. This is a highly desirable condition to have when operating in congested districts, as the clutch can be thrown in and released again instantly without fear of the teeth $t$ catching and causing the vehicle to be propelled farther than desired. At the same time the slack has been taken up on the brake mechanism so that when the operator desires he can stop the vehicle instantly, as the least pressure on the brake pedal $5'$ is effective.

When the brake-ratchet is set (Fig. 6) the long arm of the clutch-ratchet 4 is depressed by the lever 9 which has been tripped by the shoulder $a'$ to a position the reverse of that shown in Fig. 5, thereby holding the teeth $t$ of the clutch-ratchet out of engagement with the edge $e$ so that it is impossible to set the clutch-ratchet when the brake is set, there being no means (such as the offsets $b$, $c$) to force the ratchet 4 up again, as is the case with the brake-ratchet. If the clutch-ratchet 4 is actuated when the brake is set it will simply fly back again under the action of the spring 50' and no harm will be done.

Having described my invention, what I claim is:—

1. In combination with a suitable running gear, a motor, a brake mechanism for controlling the running gear terminating at one end in a ratchet, a clutch interposed between the motor and running gear, suitable clutch operating mechanism terminating at one end in a ratchet, and a suitable lever interposed between the brake-ratchet and the clutch ratchet, for controlling the latter upon operation of the brake-ratchet.

2. In combination with a suitable running-gear, a motor, a clutch interposed between the motor and running gear, suitable clutch-operating mechanism, brake mechanism for controlling the running gear, the clutch-operating mechanism and brake mechanism each terminating at one end in a suitable ratchet, a lever coöperating with the ratchets to release the clutch-ratchet upon throwing the brake-ratchet.

3. In combination with a suitable running gear, a motor, a clutch interposed between the motor and running gear, suitable clutch-operating mechanism, brake-actuating mechanism for the running gear, the clutch-mechanism and brake-mechanism each terminating at one end in a suitable ratchet, provided with a shoulder or ledge for a portion of its length, a suitable lever provided with guide lugs at each end thereof, coöperating with the ratchets, said guide lugs engaging said shoulders to cause the clutch-ratchet to be released upon application of the brake.

In testimony whereof I affix my signature, in presence of two witnesses.

JOHN H. DE BUHR.

Witnesses:
  EMIL STAREK,
  FANNIE E. WEBER.